United States Patent [19]

Barz et al.

[11] Patent Number: 5,380,543
[45] Date of Patent: Jan. 10, 1995

[54] CHEESE COMPOSITION

[75] Inventors: Richard L. Barz, Castle Rock; Ann V. Durkin, Littleton, both of Colo.

[73] Assignee: Leprino Foods Company, Denver, Colo.

[21] Appl. No.: 130,420

[22] Filed: Oct. 1, 1993

Related U.S. Application Data

[63] Continuation of Ser. No. 835,347, Feb. 14, 1992, abandoned.

[51] Int. Cl.⁶ .............................................. A23C 19/09
[52] U.S. Cl. ................................... 426/582; 426/103; 426/289; 426/524
[58] Field of Search ................ 426/103, 582, 289, 524

[56] References Cited

U.S. PATENT DOCUMENTS

| | | | |
|---|---|---|---|
| 3,900,574 | 8/1975 | Warwick | 426/274 |
| 4,552,774 | 11/1985 | Gronfor | 426/582 |
| 4,695,475 | 9/1987 | Zwiercan et al. | 426/582 |
| 4,753,815 | 6/1988 | Kielsmeier et al. | 426/582 |
| 4,847,107 | 7/1989 | Linse-Loefgren | 426/549 |
| 4,894,245 | 1/1990 | Kielsmeier et al. | 426/582 |
| 4,937,091 | 6/1990 | Zallie et al. | 426/582 |
| 4,940,600 | 7/1990 | Yokoyama et al. | 426/582 |
| 4,997,670 | 3/1991 | Kielsmeier et al. | 426/582 |
| 5,030,470 | 7/1991 | Kielsmeier et al. | 426/582 |

OTHER PUBLICATIONS

National Starch and Chemical Corp. Technical Service Bulletin; Firm-Tex ® (2 pages).
Modified Starches: Properties and Uses, O. B. Wurzburg, ed., CRC Press Inc. (1986) pp. 13–18, 55–56, 79, 89, 97, 113, 131, 149 and 179.
National Starch and Chemical Corp. Technical Service Bulletin: Crisp Film ® (2 pages).

*Primary Examiner*—Helen Pratt
*Attorney, Agent, or Firm*—Fitzpatrick, Cella, Harper & Scinto

[57] ABSTRACT

By adding a minor amount of starch to a natural mozzarella cheese, the baking characteristics of the cheese when used to make a pizza can be altered, making it more suitable for a particular set of baking conditions, e.g., involving time, temperature, type of oven, crust thickness, and the toppings used. For example, the addition of about 0.001 to 0.01 wt. % of a modified high amylose starch allows a pizza with a partially pre-baked crust to be baked at 685° F. in an impingement oven in as little time as 70 seconds, with the cheese being fully melted, evenly browned, and covered with small blisters, as is desired, and the crust being properly baked. Without the addition of the starch, the cheese, although melted, is not brown or blistered by the time the crust is "done."

10 Claims, No Drawings

CHEESE COMPOSITION

This application is a continuation of application Ser. No. 07/835,347 filed Feb. 14, 1992, now abandoned.

FIELD OF THE INVENTION

This invention relates to cheese compositions for use in preparing baked foods. More particularly, it relates to mixtures of natural mozzarella cheese and starch for use in baking pizzas.

BACKGROUND

In the baking of a pizza made with natural mozzarella cheese, it is desired that the cheese go through a number of transformations. The cheese melts; some of the unbound water in the cheese is evaporated; some of the milkfat separates ("oils off"); and some of the protein browns and blisters. Each of these transformations has to occur in moderation to obtain a commercially acceptable product. Also, the baked cheese must have a chewy, stringy texture and consistency, with no off-flavor components. In addition, during baking, the moisture release from the cheese must be controlled to achieve desired cooking characteristics.

Natural mozzarella cheeses can vary in moisture and milkfat content, e.g., within the ranges of about 45 to 60 percent moisture and about 16 to 25 percent milkfat (wet basis). The moisture includes both bound and unbound water (sometimes called "free moisture") and is measured as the percent of weight lost when the cheese is dried overnight in a 200° C. oven. "Wet milkfat" content refers to the percentage of milkfat based on the weight of the entire cheese, not just the solids. The milkfat content of mozzarella also can be reported as "fat on dry basis" (or FDB), which is the percent milkfat based on the weight of dried solids in the cheese.

The ratio of unbound water to bound water in mozzarella can vary. By "unbound water" is meant the moisture that is not chemically or physically bound in the cheese. The molecular structure of the protein can vary also, depending on the extent of proteolysis the cheese has undergone.

Different mozzarella cheeses bake best at different oven temperatures and/or in different types of ovens. Oven temperatures used to bake pizzas range from about 400° F. to about 1,000° F. Among the different ovens employed are deck ovens, impingement ovens, and infrared ovens.

A deck oven is a type of oven that uses radiant and conductive heat. Older style pizza ovens are typically deck ovens.

An impingement oven is a type of oven that uses mostly convection to heat the pizza, as well as some heat of conduction. The newer pizza ovens typically are of the impingement type. Some pass the pizzas through on conveyors.

A radiant oven is a type in which the pizza is baked by radiant heat.

The growth of the pizza industry has resulted in a variety of styles of pizzas (i.e., pan pizza, thin pizzas, etc.) and a variety of means to bake such pizzas (i.e., deck ovens, impingement ovens, etc.) The mozzarella that will perform acceptably under one set of conditions often is different (in terms of moisture or fat content, protein composition, etc.) from the mozzarella that will perform acceptably under a different set of conditions. To satisfy this diversity, it has been necessary to manufacture a wide variety of mozzarella cheeses of varying chemical compositions, aging requirements, etc., to meet desired baking characteristics (i.e., browning, meltdown, fat release, and blistering.) It would be an advance in the technology if a way could be found to modify a basic mozzarella to alter its baking characteristics, so that it could satisfactorily serve in at least two different environments: one when it is unmodified, the other when it is modified.

BRIEF DESCRIPTION OF THE INVENTION

We have found that by the addition of a minor amount of starch to a natural mozzarella cheese, its baking characteristics can be altered, making it more suitable for a particular set of baking conditions (e.g., time, temperature, oven type, crust thickness, and toppings) than it is if it does not have the starch mixed with it.

Thus, for example, if a pizzeria wants to provide extra-fast service—as in a drive-through operation—it might use a pizza with a partially pre-baked crust and bake it in an impingement oven at a relatively high temperature (e.g., about 685° F.), in hopes of getting an acceptable pizza in as little time as, say, one minute and ten seconds, which will be the time when the crust and the other ingredients arrive at their peak baked condition. (I.e., if the pizza were left in the oven longer, the crust and/or any toppings would be overbaked.) Unmodified mozzarellas, however, tend not to brown sufficiently at that temperature in so short a time. But by the addition of a minor amount of starch to the mozzarella, the cheese can be made to meet this quick-baking requirement.

The addition of starch to the mozzarella can also be useful to obviate a problem that occasionally is seen when making pizzas with natural mozzarella having a moisture content of about 52 weight percent or higher, e.g., in the range of about 52 to 60%. If baked, say, at a temperature in the range of about 400° to 650° F. in a deck oven, the cheese sometimes tends to release so much water that it damages the crust, e.g., makes it damp or soggy in the center. We have found that by mixing starch in the cheese, this problem can be greatly alleviated, if not eliminated altogether.

It has also been discovered that under certain conditions the addition of starch can retain enough of the free moisture in natural mozzarella cheese during the baking process to give the cheese a more tender chew. In this manner, a mozzarella can be made similar in creaminess to one having a higher fat/lower moisture composition.

This discovery has significant impact on both the manufacturer of natural mozzarella cheese and the pizza industry. The value to a manufacturer of being able to produce a single style or variety of mozzarella cheese is that it allows the manufacturer to gain production efficiencies, in addition to manufacturing the most profitable variety of mozzarella cheese based on chemical composition. The ability to alter a single variety of mozzarella cheese, by the addition of starch, allows the manufacturer to meet desired baking characteristics over a wide variety of cooking conditions used in the pizza industry. To the pizza industry, this discovery allows the purchase of the most economical variety of mozzarella cheese, without impacting the desired baking characteristics. Additionally, it allows the pizza industry to significantly change the style of pizza, method of cooking, etc., and yet obtain a pizza in which the baked characteristics of the mozzarella are desirable.

DETAILED DESCRIPTION OF THE INVENTION

When using starch to promote quick browning at high temperatures, it is believed best to use about 0.001 to 0.01 percent, based on the weight of the cheese. A type of starch we have found works well for this purpose is CRISP FILM ® starch from National Starch and Chemical Company. This is a modified high amylose corn starch. ("High amylose" starches have an amylose content in the range of 40 to 100 weight percent.) It has a moisture content of 11% and exhibits a pH of approximately 6.

When using starch to alleviate a water release problem, it is believed best to use a starch that exhibits a gelatinization temperature below about 150° F. A type of starch we have found works well for this purpose is FIRM-TEX ® starch from National Starch and Chemical Company. This is a modified corn starch derived from waxy maize. It has a moisture content of 11% and exhibits a pH of approximately 6 and a gelatinization temperature of about 120° F. It is believed that the starch is best used in an amount in the range of about 0.0005 to 0.01 percent, based on the weight of the cheese.

Generally speaking, the higher the moisture content of the mozzarella, the greater the amount of starch that will be desired, e.g., to avoid crust damage or to promote quick browning.

To achieve quick browning of the starch-modified cheese, the pizza will generally be baked at an oven temperature in the range of about 550° to 850° F.

The water-release problem sometimes experienced when baking pizzas with unmodified mozzarella having upwards of about 52% moisture can be exacerbated when moist vegetables are used as toppings. These varieties of mozzarella usually have a milkfat content (dry basis) of about 17 to 25 percent and are usually baked at oven temperatures in the range of about 400° to 650° F.

It is believed that starch will suitably alter the bake performance of mozzarella whether it is mixed in during the manufacture of the cheese or it is coated onto particles of the finished cheese.

The traditional method of manufacturing natural mozzarella involves the following steps:

a) pasteurizing cow's milk having a fat content in the range of about 1.5 to 3.5 weight percent (in some countries water buffalo milk is used);

b) fermenting the milk with one or more lactic acid-producing bacteria to obtain a cheese milk;

c) coagulating the cheese milk to obtain a coagulum comprised of curd and whey;

d) cutting the coagulum and draining the whey therefrom, thereby leaving a cheese curd;

e) heating, kneading, and stretching the cheese curd until it is a homogeneous, fibrous mass having a moisture content in the range of about 45 to 60 weight percent (dried solids basis);

f) placing the mass in a bath of cold brine and leaving it there long enough to achieve cooling and salt penetration; and g) removing the cooled cheese from the brine.

We contemplate that the starch can be mixed into the cheese either during step (d) or during step (e).

Alternatively, the finished cheese can be comminuted—e.g., shredded or diced—and the starch can be mixed in with the cheese particles at that stage of the manufacturing process. The mixing can be done either by dusting the particles with the starch in powdered form, or by spraying or blending the cheese particles with an aqueous dispersion of the starch. It is believed that dispersion concentrations in the range of about 3 to 30 weight percent will often be preferred.

If the cheese is comminuted before being mixed with the starch, it is preferred that the cheese particles be frozen first, e.g., by independent quick freezing. This will facilitate mixing, because, as compared to unfrozen mozzarella, frozen mozzarella particles have less tendency to stick together when they are tumbled by a mixing apparatus.

The invention will perhaps be better understood by considering the following examples, which are offered for illustration purposes only. Unless otherwise indicated, all percentages are by weight.

Example I

Mozzarella cheese having a moisture content of 53.2%, a milkfat (dried solids basis) content of 44.2%, a salt content of 1.45%, and a pH of 5.32 was prepared in the conventional manner, described above. Using the process disclosed in U.S. Pat. No. 4,753,815 to Kielsmeier et al., the cheese was shredded into particle sizes of approximately ⅛ inch by 3/16 inch by ¾ inch and then independently quick frozen in a cold-air-driven fluidized bed freezer. As the frozen cheese particles emerged from the freezer on a conveyor belt, they were simultaneously tumbled by rotating mixing wands and sprayed with a 30% aqueous dispersion of the aforementioned CRISP FILM LK5132 starch. The dispersion was sprayed at an application rate of 2.5%, based upon the weight of the cheese. The temperature of the cheese particles leaving the freezer was sufficiently low (about −20° F.) that the dispersion froze essentially instantaneously as it hit and coated the cheese particles.

To evaluate the bake performance of the starch-modified mozzarella, it was used to quick-bake a pizza with a partially pre-baked crust. One hundred twenty (120) grams of fresh pizza dough was proofed for 1½ hours at room temperature in an oiled, 5-inch diameter pizza pan. (By "proofing" is meant allowing the yeast to work and the dough to rise.) Then 1 oz. of tomato sauce and 1 oz. of the cheese were spread on the dough. (This is all of the sauce needed for a pizza of this size, but only ⅓ of the cheese.) The pan, which was 1½ inches deep, was covered with a lid and run through a Middleby Marshal 360 conveyor oven set at 525° F. (This is a gas-fired, impingement style oven.) It took 6 minutes and 30 seconds for the pan to pass through the oven. This resulted in a partially prebaked pizza crust with a thin base coating of tomato sauce and mozzarella on it. The crust was allowed to cool to room temperature, following which it was placed, still covered, in a residential-style, electric oven set at "Warm" (about 200° F.) for one-half hour. (This duplicates the conditions used in drive-through pizzerias, in which the partially pre-baked pizza crusts are held in a tempering oven.) After tempering, the pan was uncovered and two more ounces of the cheese were sprinkled on the pizza, and the pizza was baked uncovered in a Lincoln-Wearever gas impingement-type oven for 1 minute and 10 seconds at 685° F. The finished pizza was satisfactory in appearance and taste. The cheese was fully melted, evenly browned, and covered with small blisters. Oiling off was moderate, giving the top surface a moist appearance.

As a control, the same cheese, but without a starch coating, was used to prepare a pizza in the same manner as just described. To match the moisture content, the cheese was sprayed with 2.5 percent of plain water as it emerged from the fluidized bed freezer. Although the cheese on the resulting pizza exhibited acceptable meltdown and oiling off, the cheese was not brown or blistered. As such it appeared "undone." Had the pizza been left in the oven longer, its crust would have been overbaked.

Example II

The same mozzarella as used in Example I was used in this example, except that it was sprayed with a 4% dispersion of a waxy maize cornstarch (National Starch & Chemical Company's FIRM-TEX 51-1482). Again, the dispersion application rate was 2.5%.

The cheese was used to bake a thick-crust pizza. Twenty-four (24) ounces of proofed pizza dough was placed in a 12-inch diameter pan that was 2 inches deep. Four (4) ounces of tomato sauce and 12 ounces of the cheese were spread on the dough. The pizza was baked for 15 minutes in a Blodgett deck oven set at 500° F. The finished pizza was satisfactory in appearance, structure, and taste. The crust was cooked properly and uniformly, with no sogginess.

As a control, the same cheese, but without the starch coating, was used to prepare a thick-crust pizza in the same way. The cheese had been sprayed with 2.5% plain water, rather than a starch dispersion. The control pizza was satisfactory in appearance, but the center region of the crust was soggy, making the pizza unacceptable.

We claim:

1. A cheese composition for baking on a pizza, comprising a mixture of natural mozzarella cheese and a minor amount of starch, wherein the cheese is comminuted and the starch is present as a coating on the cheese particles in an amount within the range of about 0.0005 to 0.01%, based on the weight of the cheese.

2. The composition of claim 1 wherein the starch has a gelatinization temperature below about 150° F.

3. The composition of claim 2 wherein the cheese particles are frozen.

4. The composition of claim 1 wherein the starch is a modified starch derived from waxy maize.

5. The composition of claim 4 wherein the cheese particles are frozen.

6. The composition of claim 1 wherein the cheese particles are frozen.

7. The composition of claim 6 wherein the starch is present in an amount within the range of about 0.001 to 0.01 percent, based on the weight of the cheese.

8. The composition of claim 1 wherein the starch is a modified high amylose corn starch.

9. The composition of claim 8 wherein the cheese particles are frozen.

10. The composition of claim 9 wherein the starch is present in an amount within the range of about 0.001 to 0.01 percent, based on the weight of the cheese.

* * * * *